(12) United States Patent
Wang

(10) Patent No.: US 10,174,723 B2
(45) Date of Patent: Jan. 8, 2019

(54) BOTTOM FIRE DENSE PHALANX FORCIBLE MEASUREMENT OF HYDROGEN-OXYGEN COMPLETE COMBUSTION VEHICLE EXHAUST POLLUTANT-ELIMINATION NEAR ZERO TANK

(71) Applicant: Haoxue Wang, Xi'an (CN)

(72) Inventor: Haoxue Wang, Xi'an (CN)

( * ) Notice: Subject to any disclaimer, the term of this patent is extended or adjusted under 35 U.S.C. 154(b) by 1 day.

(21) Appl. No.: 15/468,075

(22) Filed: Mar. 23, 2017

(65) Prior Publication Data
US 2017/0191451 A1   Jul. 6, 2017

Related U.S. Application Data

(63) Continuation-in-part of application No. PCT/CN2015/091791, filed on Oct. 13, 2015.

(30) Foreign Application Priority Data

Oct. 13, 2014   (CN) .......................... 2014 1 0539207

(51) Int. Cl.
*F02M 25/10* (2006.01)
*F02M 25/14* (2006.01)

(52) U.S. Cl.
CPC ............ *F02M 25/10* (2013.01); *F02M 25/14* (2013.01); *Y02T 10/121* (2013.01)

(58) Field of Classification Search
CPC ................................ F02M 25/10; F02M 25/08
See application file for complete search history.

(56) References Cited

U.S. PATENT DOCUMENTS

| | | | | |
|---|---|---|---|---|
| 4,306,894 A | * | 12/1981 | Fukami | B01D 53/0446 123/519 |
| 5,904,042 A | * | 5/1999 | Rohrbaugh | F01N 3/0211 422/171 |
| 2003/0226795 A1 | * | 12/2003 | Merritt | B01D 29/15 210/238 |
| 2011/0308394 A1 | * | 12/2011 | Kim | F02M 25/0836 96/146 |

FOREIGN PATENT DOCUMENTS

KR    20040017053 A  *  2/2004

* cited by examiner

*Primary Examiner* — Jacob Amick
*Assistant Examiner* — Charles Brauch
(74) *Attorney, Agent, or Firm* — Matthias Scholl P.C.; Matthias Scholl

(57) ABSTRACT

A device for removing pollutants from an automobile exhaust, the device including: a body filled with active carbon particles, first supporting columns, an output pipe for outputting a fuel additive, a basin-shaped base of a regulating valve box, a top cover, a regulating pipe, second supporting columns, a bearing grid plate configured to bear the active carbon particles, a bottom sealing cover, and an air pipe. The first supporting columns are disposed on the top of the body. The output pipe is connected to the middle part of the top of the body via the first supporting columns. The basin-shaped base of the regulating valve box is connected to two sides of the top of the body via the first supporting columns. The basin-shaped base is connected to the top cover; the regulating pipe is disposed on the upper part of the top cover.

7 Claims, 2 Drawing Sheets

BOTTOM FIRE DENSE PHALANX FORCIBLE MEASUREMENT OF HYDROGEN-OXYGEN COMPLETE COMBUSTION VEHICLE EXHAUST POLLUTANT-ELIMINATION NEAR ZERO TANK

CROSS-REFERENCE TO RELATED APPLICATIONS

This application is a continuation-in-part of International Patent Application No. PCT/CN2015/091791 with an international filing date of Oct. 13, 2015, designating the United States, now pending, and further claims foreign priority benefits to Chinese Patent Application No. 201410539207.6 filed Oct. 13, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a device for removing pollutants from an automobile exhaust by successfully developing the patent device and pioneering the use of the device in cylinder of engine among compressed gas mixed building bottom fire dense array so as to maximize the elimination of exhaust pollutants, close to zero pollution, zero emissions.

Description of the Related Art

Typically, the internal combustion engines combust a fuel-air mixture to generate driving force. The fuel-air mixture is injected into a combustion chamber and ignited to produce a flame. However, the diffusion velocity of the flame is relatively low and the penetrating power of the flame is relatively weak. Besides, when the internal combustion engine rotates at high speed, the retention time of the fuel-air mixture in the combustion chamber is relatively short. All this leads to an incomplete combustion of the fuel-air mixture and causes the generation of plenty of pollutants. Based on existing exhaust treatment technologies and complex combined devices, no more than 80-90% of the pollutants can be removed.

SUMMARY OF THE INVENTION

In view of the above-described problems, it is one objective of the invention to provide a device for removing pollutants from an automobile exhaust. The fuel can be completely combusted in the combustion chamber of an engine equipped with the device of the invention, and thus leading to approximately zero emissions of pollutants from the exhaust gas.

To achieve the above objective, in accordance with one embodiment of the invention, there is provided a device for removing pollutants from an automobile exhaust, the device comprising: a body filled with active carbon particles, first supporting columns, an output pipe for outputting a fuel additive, a basin-shaped base of a regulating valve box, a top cover, a regulating pipe, second supporting columns, a bearing grid plate configured to bear the active carbon particles, a bottom sealing cover, and an air pipe. The first supporting columns are disposed on a top of the body. The fuel additive comprising liquid hydrogen and liquid oxygen is adsorbed and sealed in the active carbon particles. The output pipe is connected to a middle part of the top of the body via the first supporting columns. The basin-shaped base of the regulating valve box is connected to two sides of the top of the body via the first supporting columns. The basin-shaped base is connected to the top cover. The regulating pipe is disposed on an upper part of the top cover. The second supporting columns are disposed on a bottom of the body and lower parts of the second supporting columns are connected to the bearing grid plate. The bearing grid plate and the bottom sealing cover of the body are in sealed connection through thermal adhesion; and the air pipe is disposed on the bottom sealing cover.

In a class of this embodiment, a first non-woven cloth is disposed between the top of the body and the first supporting columns. A second non-woven cloth is disposed between a bottom of the body and the second supporting columns.

In a class of this embodiment, the basin-shaped base of the regulating valve box and the top cover are connected via a fastener; and a rubber sealing ring is disposed between the basin-shaped base and the top cover. Thus, when the engine is in an off state, the liquid hydrogen and the liquid oxygen are ensured adsorbed within the active carbons; and when the engine is started, the liquid hydrogen and the liquid oxygen are desorbed from the active carbons and output via the output pipe, where a dose of the fuel additive is regulated by a brass regulating valve, and injected into the cylinder to form the primer array for realizing the complete combustion of the fuel.

In a class of this embodiment, the output pipe is disposed on a base of a gas collection stove of the regulating valve box.

In a class of this embodiment, a gas gathering and diversion fan assembly and positioning convex blocks are attached to inner and outer surfaces of the top cover, respectively.

In a class of this embodiment, four positioning claws are symmetrically disposed outside the bottom sealing cover through thermal adhesion. The four positioning claws are used for positioning during processing.

In a class of this embodiment, two diversion fans are symmetrically disposed in the bottom sealing cover.

In a class of this embodiment, a connection pipe is disposed between the first supporting columns outside of the body, and the connection pipe communicates with the body. The connection pipe functions as an active carbon device.

Advantages of the device for removing the pollutants from the automobile exhaust according to embodiments of the invention are summarized as follows:

1. The device of the invention can establish a primer array formed by the liquid hydrogen and the liquid oxygen among the compressed fuel-air mixture within the cylinder during the operation of the engine. As the liquid hydrogen and the liquid oxygen are excellent fuel additive and very sensitive to micro flames, the fuel-air mixture can be completely combusted within approximately one half of an original retaining time in the cylinder, thus, the pollutants are greatly eliminated from the exhaust gas.
2. The basin-shaped base of the regulating valve box and the top cover are connected via the fastener and sealed by the ultrasonic welding. Thus, the vacuum pumping and the compression of the fuel-air mixture are realized under the mechanical power of the piston of the internal combustion engine, no leakage occurs during the whole process, which ensures the complete combustion of the fuel-air mixture.

3. No additional complex devices (mechanical, electronic, or chemical devices) are required to cooperate with the engine equipped with the device of the invention for eliminating the pollutants from the exhaust gas, so the elimination of the pollutants from the exhaust gas is economic and efficient.

BRIEF DESCRIPTION OF THE DRAWINGS

The invention is described hereinbelow with reference to the accompanying drawings, in which.

Figure 1:
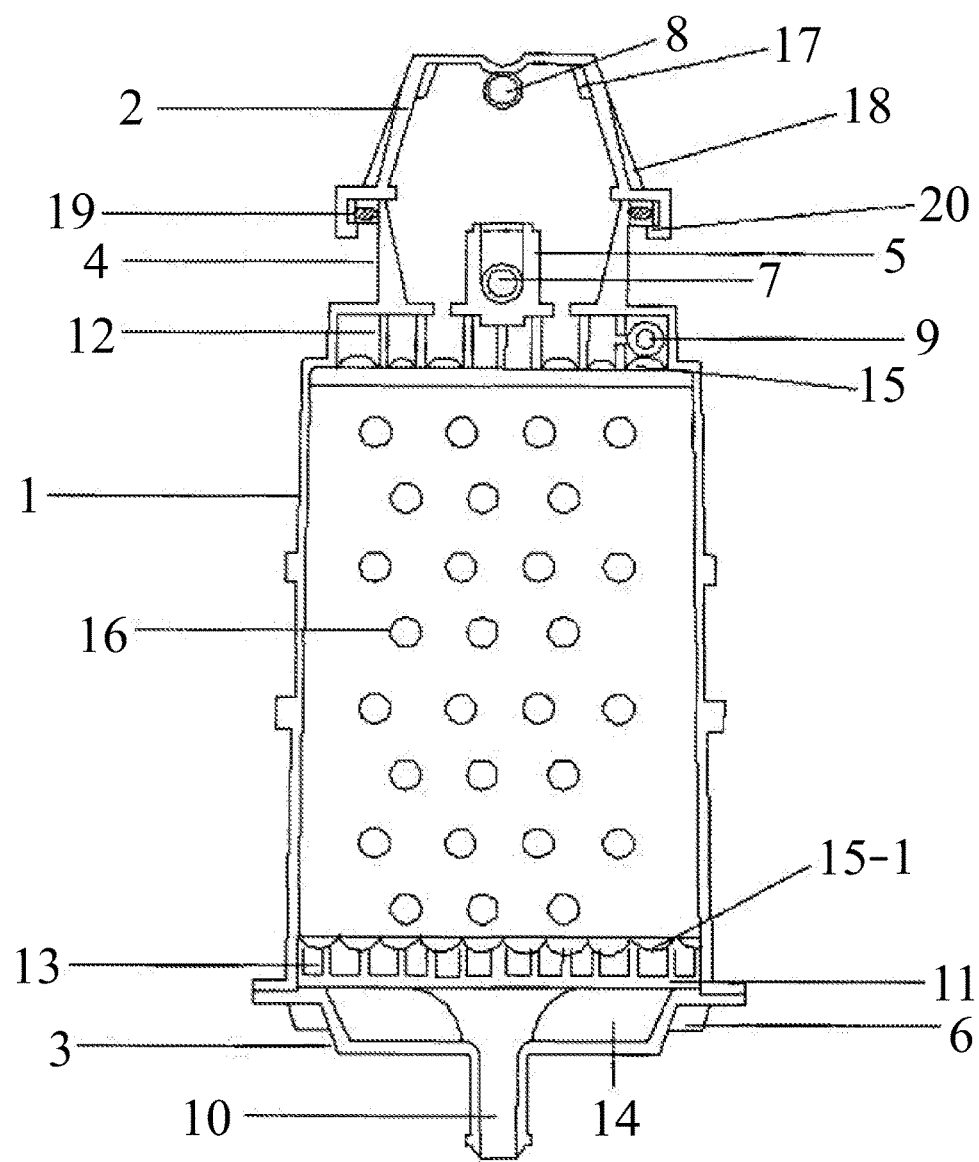
FIG. 1 is a cross sectional view of a device for removing an automobile exhaust in accordance with one embodiment of the invention.

In the drawings, the following numbers are used: 1. Body; 2. Top cover; 3. Bottom sealing cover; 4. Basin-shaped base of a regulating valve box; 5. Base of gas collection stove of regulating valve box; 6. Four positioning claws; 7. Output pipe; 8. Regulating pipe; 9. Connection pipe; 10. Air pipe; 11. Bearing grid plate; 12. First supporting columns; 13. Second supporting columns; 14. Diversion fans; 15. First non-woven cloth; 15-1. Second non-woven cloth; 16. Active carbon particles; 17. Gas gathering and diversion fan assembly; 18. Positioning convex blocks; 19. Rubber sealing ring; and 20. Fastener.

DETAILED DESCRIPTION OF THE EMBODIMENTS

For further illustrating the invention, experiments detailing a device for removing pollutants from an automobile exhaust are described below. It should be noted that the following examples are intended to describe and not to limit the invention.

Figure 2:
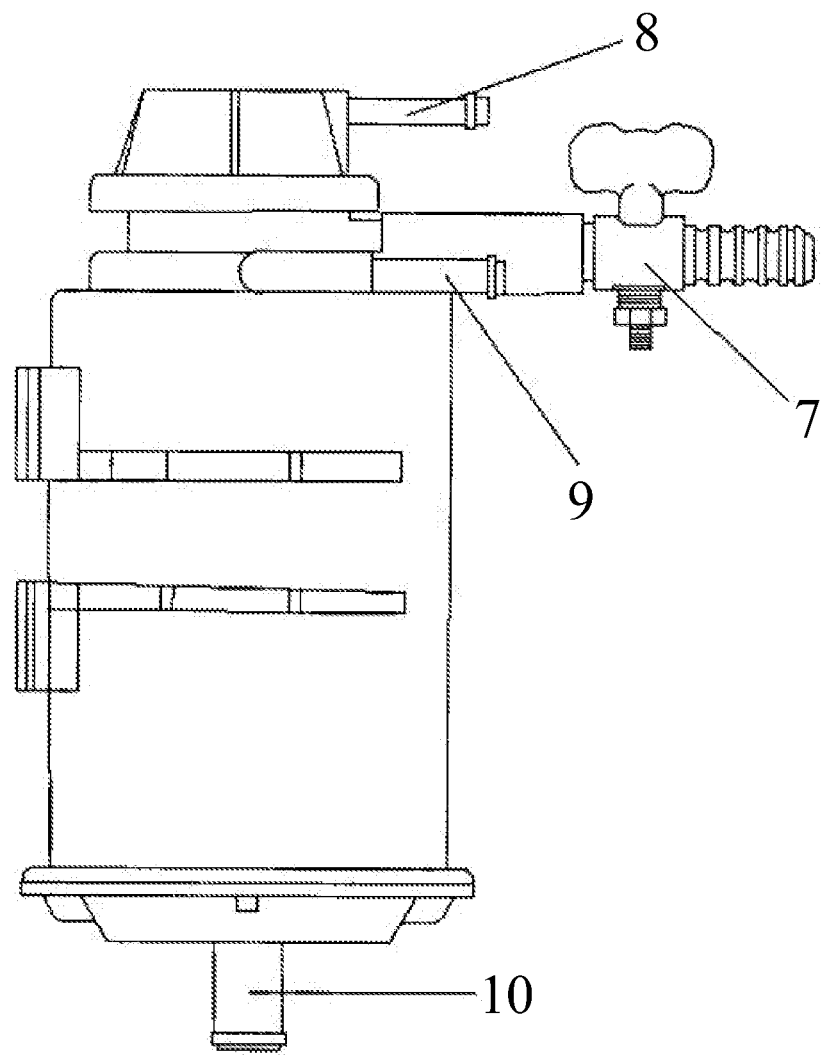
FIG. 2 is a side view of a device for removing an automobile exhaust in accordance with one embodiment of the invention.

A device for removing pollutants from an automobile exhaust, as shown in FIG. 1-2, comprises: active carbon particles 16 adsorbed with a fuel additive functioning in assisting combustion and preventing explosion and a body 1. An output pipe 7 for outputting the fuel additive is connected to a middle part of the body via first supporting columns 12. A basin-shaped base 4 is connected to two sides of the body 1 via first supporting columns 12. The basin-shaped base 4 is connected to a top cover 2. A regulating pipe 8 is disposed on an upper part of the top cover 2. A bottom of the body 1 is connected to a bearing grid plate 11 for bearing the active carbons via second supporting columns 13. The bearing grid plate 11 and a bottom sealing cover 3 are in sealed connection through thermal adhesion. An air pipe 10 is disposed on the bottom sealing cover 3. A first non-woven cloth 115 is disposed between the top of the body 1 and the first supporting columns 12, and a second non-woven cloth 15-1 is disposed between a bottom of the body 1 and the second supporting columns 13. The basin-shaped base 4 of the regulating valve box and the top cover 2 are connected via a fastener 20 and sealed by using ultrasonic welding. A sealing groove is disposed between the basin-shaped base 4 of the regulating valve box and the top cover, and a rubber sealing ring 19 is disposed in the sealing groove. The output pipe 7 is disposed on a base 5 of a gas collection stove of the regulating valve box. A fan assembly 17 for gas gathering and diversion and positioning convex blocks 18 are attached to inner and outer surfaces of the top cover 2, respectively. Four positioning claws 6 are symmetrically disposed outside the bottom sealing cover 3 through thermal adhesion. Two diversion fans 14 are symmetrically disposed in the bottom sealing cover 3. A connection pipe 9 is disposed between the first supporting columns 12 outside of the body 1, and the connection pipe 9 communicates with the body 1.

When manufacturing the device, the fuel additive functions in assisting combustion and prevents explosion is firstly adsorbed into the active carbon particles 16. The fuel additive is an aviation fuel additive, such as HOF31-41, which adopts liquid hydrogen and liquid oxygen as main components. The active carbon particles adsorbed with the fuel additive are then filled into the body 1. The output pipe 7 is connected to a main regulating valve of an intake manifold of an engine via a first three-path joint so that the liquid hydrogen and the liquid oxygen in the fuel additive are desorbed from the active carbon particles 16 under a strong mechanical force of vacuum pumping of a piston in a cylinder of the engine at the moment the engine is started to suck fresh air in. When a high pressure fuel-air mixture is injected into the cylinder using electronic injection, the fuel-air mixture is automatically mixed with the additive under the action of the piston of the engine. Thus, the liquid hydrogen and the liquid oxygen are distributed in the fuel-air mixture to form a primer array. Triggered by electronic ignition, the trace amount of the liquid explosive explodes. Because the liquid hydrogen and the liquid oxygen are strongly sensitive to micro flames, the primer array formed by the liquid hydrogen and the liquid oxygen instantaneously produces a series of micro-explosions to form flames having strong penetrating power. It is known that the common fuel-air mixture has the following problems: the flame after the ignition of the common fuel-air mixture has slow diffusion velocity and small penetrating power; as the rotational speed of an internal combustion engine is too high and the retaining time of the fuel-air mixture in the cylinder is too short, the fuel-air mixture is incompletely combusted, which leads to the pollution of an exhaust gas. The use of the device of the invention is able to thoroughly overcome the above problem and realize the purpose of eliminating the exhausted pollutants to the utmost, so that the fuel-air mixture can be completely combusted under a retaining time of equal to or shorter than one half of the original and a higher diffusion velocity of the flame. The flame expands to the trace amount of the fuel-air mixture from an expansion joint of a piston ring, to a crankcase, and to a discharge flue, to completely combust the fuel-air mixture therein. And the clear water vapor and carbon dioxide after complete combustion of the fuel-air mixture are discharged to the atmosphere. As the fuel-air mixture is completely combusted, the dynamic performance and the acceleration of the engine are increased. In addition, the output regulating pipe 8 is directly connected to an oil pressure regulator via a second three-path joint to reduce the oil pressure and to leave a certain space of the cylinder for subsequently feeding the liquid hydrogen and liquid oxygen. Thus, it is ensured that after the injection of the additive, the mixing concentration resulted in injection of the new fuel additive is prevented from being too large and the increment in the exhaust gas is also avoided.

The basin-shaped base of the regulating valve box and the top cover are connected via the fastener and sealed by the ultrasonic welding. During vacuum pumping and compression of the fuel-air mixture under the strong mechanical power of the piston of the internal combustion engine, the liquid hydrogen and the liquid oxygen of the fuel additive are desorbed from the active carbon particles and input into the cylinder along with the sucked fresh air. The fuel-air mixture, the liquid hydrogen and the liquid oxygen, and the fresh air form a high-energy combustion gas mixture in the cylinder and output therefrom. Leakage is avoided in the whole process, and the sealing connection of the basin-shaped base and the top cover is therefore very important to the device.

The output pipe is connected to a base of a gas collection stove of the regulating valve box, an outer side of an end of the output pipe is connected to a dose regulating valve. To regulate a dose of the fuel additive, a read of detected pollutants is known from a panel of a precision measuring instrument, and the dose regulating valve is adjusted to control the dose of the fuel additive injected into the cylinder to satisfy complete combustion of the fuel-air mixture. Thus, pollutants in the exhausted gas are thoroughly combusted.

Six diversion fans in three pairs are disposed inside the top cover for gathering gas. A gas gathering space is formed by the first non-woven cloth, the first supporting columns, the top of the device, and an inner wall. The diversion fans are able to accumulate the high-energy fuel additive including the liquid hydrogen and the liquid oxygen in the gas gathering space. The flow of the fuel additive is sucked into the regulating valve box and disturbed when knocking into the inner wall. The disturbed flow is then accumulated and stabilized in the top of the device under the action of the diversion fans and directed to a convex top of the top cover. Thus, the diversion fans disposed inside the top cover functions in gathering a disturbed flow and converting a direction of the flow to the convex top to an opening of a gas collection stove which is disposed beneath the convex top. Also, the diversion fans serve as stiffeners inside the regulating valve box. The diversion fans facilitate the flow of the high-energy fuel additive towards the opening of the gas collection stove and functions as an output cylinder.

Four positioning claws 6 are symmetrically disposed outside the bottom sealing cover 3 through thermal adhesion. The four positioning claws 6 are provided with vertical coordinates for planar correction and match with a tenon and mortise joint of a clamp. The four positioning claws are conducted with thermal adhesion and sealing processing.

The bearing grid plate configured to bear the active carbon particles is disposed on the bottom sealing cover of the device. The second supporting columns are disposed on an upper end of the bearing grid plate, and the second non-woven cloth is disposed on tops of the second supporting columns for gathering the fresh air. Under the strong mechanical force of the internal combustion turbine that inputs the fuel-air mixture to the cylinder, the fresh air is sucked from a bypass to the second non-woven cloth. It should be noted that the body is in a conical structure which has a lower part larger than an upper part, therefore being beneficial to accelerate the flows from the bottom upward. As the flow continuously knocks the active carbon particles, electrostatic force is produced by friction, which activates a seal agent under a surface of the active carbon particle to release the fuel additive containing the liquid hydrogen and the liquid oxygen. The released fuel additive is then directed to the regulating valve box where a dose of the fuel additive injected to the cylinder is strictly controlled. Thus, the primer array is established.

The air pipe is disposed on the bottom sealing cover to replenish air for the fuel additive desorbed from the active carbon particles during running of the automotive vehicle, so that the fuel-air mixture is completely combusted in the presence of the fuel additive and the fresh air. When the automotive vehicle is in maintenance, the air pipe also functions in discharging and guiding a waste out of the body after the body is washed by a high pressure gas flow.

The connection pipe is disposed outside the body and communicates with body. When the automotive vehicle is stopped, the connection pipe functions as an active carbon device and is able to gather pollutants that are evaporated from the oil due to the day-night temperature difference.

Pollutants of the exhaust were detected in a stable working condition of an automobile that adopts the device for removing the pollutants from the automobile exhaust of the invention. It was indicated from the detection results that pollutants in the exhaust of the automobile are much fewer than those discharged from the automobiles not equipped with the device of the invention, thus the device of the invention effectively eliminates the pollution of the exhaust of the automobiles. In addition, the device of the invention does not require coordinating with additional devices, thus being simple, economic, and effective. The fuel-air mixture is completely combusted, no secondary combustion is required, thus saving the energy and protecting the atmosphere.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device comprising:
   a) a body, the body comprising a substantially cylindrical wall, and a particle-holding chamber defined by the substantially cylindrical wall and filled with active carbon particles;
   b) a box, the box comprising:
      b1) a collection base;
      b2) an output pipe;
      b3) a plurality of first supporting columns;
      b4) a basin-shaped base; and
      b5) a top cover;
   c) a first non-woven cloth;
   d) a second non-woven cloth;
   e) a plurality of second supporting columns;
   f) a bearing grid plate configured to bear the active carbon particles;
   g) a bottom sealing cover; and
   h) an air pipe;
   wherein:
      a fuel additive that comprises liquid hydrogen and liquid oxygen is absorbed on the active carbon particles;
      the plurality of first supporting columns is connected to a top end of the substantially cylindrical wall;
      the basin-shaped base is disposed between and connected to the top cover and the plurality of first supporting columns;
      a gas-gathering chamber is defined by the top cover and the basin-shaped base;
      the collection base is disposed within the gas-gathering chamber and supported by the basin-shaped base;
      the output pipe is disposed on the collection base and communicates with the gas-gathering chamber;
      the output pipe is adapted to be connected to an intake manifold of a cylinder of an internal combustion engine;
      the first non-woven cloth is disposed within the particle-holding chamber and supported by the plurality of the first supporting columns;

the bearing grid plate is disposed within the particle-holding chamber and connected to the substantially cylindrical wall;

the plurality of second supporting columns is disposed within the particle-holding chamber and supported by the bearing grid plate;

the first non-woven cloth and the second non-woven cloth confine the active carbon particles within the particle-holding chamber;

the bottom sealing cover is connected to a bottom end of the substantially cylindrical wall;

the bearing grid plate and the bottom sealing cover are in sealed connection through thermal adhesion;

the air pipe is disposed on the bottom sealing cover, and communicates with air; and the active carbon particles desorb the liquid hydrogen and the liquid oxygen due to the suction created during an intake stroke of a piston of the cylinder;

when in use, the liquid hydrogen and the liquid oxygen are moved from the particle-holding chamber, through the first non-woven cloth, and into the gas-gathering chamber by the suction created during an intake stroke of a piston of the cylinder;

the air is moved through the air pipe, through the second non-woven cloth, through the particle-holding chamber, through the first non-woven cloth, and into the gas-gathering chamber by the suction created during an intake stroke of a piston of the cylinder; and the liquid hydrogen, the liquid oxygen, and the air are transferred from the gas-gathering chamber, through the output pipe and the intake manifold of the cylinder, and into the cylinder by the suction created during an intake stroke of a piston of the cylinder, wherein the liquid hydrogen, the liquid oxygen, and the air are blended with a fuel-air mixture that is sucked into the cylinder by the suction created during an intake stroke of a piston of the cylinder.

2. The device of claim 1, wherein the basin-shaped base and the top cover are connected via a fastener; and a rubber sealing ring is disposed between the basin-shaped base and the top cover.

3. The device of claim 1, wherein a gas gathering and diversion fan assembly and positioning convex blocks are attached to inner and outer surfaces of the top cover, respectively.

4. The device of claim 1, wherein four positioning claws are symmetrically disposed outside the bottom sealing cover through thermal adhesion.

5. The device of claim 1, wherein two diversion fans are symmetrically disposed in the bottom sealing cover.

6. The device of claim 1, wherein a connection pipe is disposed between the plurality of first supporting columns, and the connection pipe communicates with the particle-holding chamber.

7. The device of claim 1, further comprising a regulating pipe, wherein the regulating pipe is disposed on an upper part of the top cover.

* * * * *